US012615190B2

(12) United States Patent
Kodaypak et al.

(10) Patent No.: US 12,615,190 B2
(45) Date of Patent: Apr. 28, 2026

(54) APPARATUSES AND METHODS FOR FACILITATING AUTOMATED INTERDOMAIN COMMUNICATIONS ANALYTICS AUTOMATION FUNCTIONALITY AND PROFILING

(71) Applicant: AT&T Intellectual Property I, L.P., Atlanta, GA (US)

(72) Inventors: Rajendra Prasad Kodaypak, Sammamish, WA (US); Jie McKnight, Yarrow Point, WA (US); Joseph Dahan, Redmond, WA (US); Ryan Redfern, Cerritos, CA (US); Yaron Koral, Cherry Hill, NJ (US); Michal Cwian, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1220 days.

(21) Appl. No.: 17/177,261

(22) Filed: Feb. 17, 2021

(65) Prior Publication Data

US 2022/0263722 A1    Aug. 18, 2022

(51) Int. Cl.
    H04L 41/14 (2022.01)
    H04L 9/40 (2022.01)
    (Continued)

(52) U.S. Cl.
    CPC .............. H04L 41/14 (2013.01); H04L 63/10 (2013.01); H04W 36/0022 (2013.01);
    (Continued)

(58) Field of Classification Search
    CPC ..... H04L 41/14; H04L 63/10; H04L 65/1016; H04L 41/142; H04L 63/1408;
    (Continued)

(56) References Cited

U.S. PATENT DOCUMENTS 7,039,724 B1 *  5/2006  Lavian .................. H04L 41/046
                                                    710/110
8,458,098 B1 *  6/2013  Scardino ............ G06Q 30/0277
                                                    705/57
(Continued)

FOREIGN PATENT DOCUMENTS

WO      WO-2021181408 A1 *  9/2021  ......... H04L 41/5051

OTHER PUBLICATIONS

Quin et al. (NPL: Network Slicing Use Case Requirements, Pub. Date: Apr. 2018) (Year: 2018).*
(Continued)

*Primary Examiner* — Dhairya A Patel
*Assistant Examiner* — Vinh Nguyen
(74) *Attorney, Agent, or Firm* — Guntin & Gust, PLC; Mark Wilinski

(57)                ABSTRACT

Aspects of the subject disclosure may include, for example, analyzing data associated with a plurality of network domains, identifying, based on the analyzing of the data, a first action to be taken in a first network domain of the plurality of network domains, identifying, based on the analyzing of the data, a second action to be taken in a second network domain of the plurality of network domains, issuing a first directive to the first network domain to cause a first communication device in the first network domain to take the first action, and issuing a second directive to the second network domain to cause a second communication device in the second network domain to take the second action. Other embodiments are disclosed.

19 Claims, 9 Drawing Sheets

(51) Int. Cl.

| | |
|---|---|
| *H04W 36/00* | (2009.01) |
| *H04W 36/04* | (2009.01) |
| *H04W 48/02* | (2009.01) |
| *G06Q 50/00* | (2012.01) |
| *H04L 65/1016* | (2022.01) |

(52) U.S. Cl.
CPC ....... *H04W 36/0038* (2013.01); *H04W 36/04* (2013.01); *H04W 48/02* (2013.01); *G06Q 50/01* (2013.01); *H04L 65/1016* (2013.01)

(58) Field of Classification Search
CPC ............... H04L 65/1095; H04L 41/16; H04L 43/0876; H04L 65/80; H04W 36/0022; H04W 36/0038; H04W 36/04; H04W 48/02
See application file for complete search history.

(56) References Cited

U.S. PATENT DOCUMENTS

| | | | | |
|---|---|---|---|---|
| 10,219,193 | B2 * | 2/2019 | Kim | H04W 4/02 |
| 10,997,135 | B2 * | 5/2021 | Zoll | G06F 18/214 |
| 11,172,400 | B2 * | 11/2021 | Chan | H04L 47/11 |
| 11,963,094 | B2 * | 4/2024 | Cai | H04W 8/18 |
| 11,997,586 | B2 * | 5/2024 | Lanev | H04W 28/16 |
| 2015/0029950 | A1 * | 1/2015 | Rath | H04W 76/00 |
| | | | | 370/329 |
| 2016/0162938 | A1 * | 6/2016 | LeBeau | G06Q 30/0255 |
| | | | | 705/14.53 |
| 2017/0079059 | A1 * | 3/2017 | Li | H04W 16/02 |
| 2017/0098246 | A1 * | 4/2017 | Vasudevan | G06Q 30/0267 |
| 2018/0054765 | A1 * | 2/2018 | Kim | H04W 36/32 |
| 2018/0081914 | A1 * | 3/2018 | Zoll | G06F 11/3452 |
| 2019/0037446 | A1 * | 1/2019 | Dowlatkhah | H04W 28/16 |
| 2019/0191352 | A1 * | 6/2019 | Chong | H04W 36/26 |
| 2019/0243865 | A1 * | 8/2019 | Rausch | G06F 16/907 |
| 2019/0357033 | A1 * | 11/2019 | Cheng | H04W 16/02 |
| 2020/0068430 | A1 * | 2/2020 | Chan | H04L 47/24 |
| 2020/0296663 | A1 * | 9/2020 | Lou | H04W 76/15 |
| 2021/0029601 | A1 * | 1/2021 | Jin | H04W 76/11 |
| 2021/0212169 | A1 * | 7/2021 | Hu | H04W 92/20 |
| 2021/0235317 | A1 * | 7/2021 | Hu | H04W 72/0446 |
| 2021/0250826 | A1 * | 8/2021 | Wang | H04W 36/0079 |
| 2021/0267001 | A1 * | 8/2021 | Takakura | H04W 76/18 |
| 2021/0282058 | A1 * | 9/2021 | Jin | H04W 36/0033 |
| 2021/0289402 | A1 * | 9/2021 | Ke | H04W 36/0066 |
| 2021/0289579 | A1 * | 9/2021 | Ke | H04W 36/0033 |
| 2021/0352534 | A1 * | 11/2021 | Tiwari | H04L 41/5009 |
| 2021/0392477 | A1 * | 12/2021 | Taft | H04W 12/37 |
| 2021/0400573 | A1 * | 12/2021 | Klatt | H04W 48/12 |
| 2021/0407012 | A1 * | 12/2021 | Silva | G06Q 30/0617 |
| 2022/0007270 | A1 * | 1/2022 | Li | H04W 8/245 |
| 2022/0015159 | A1 * | 1/2022 | Li | H04W 48/08 |
| 2022/0022044 | A1 * | 1/2022 | D'Oro | H04W 48/18 |
| 2022/0038953 | A1 * | 2/2022 | Corston-Petrie | H04W 28/088 |
| 2022/0046427 | A1 * | 2/2022 | Futaki | H04W 36/26 |
| 2022/0070654 | A1 * | 3/2022 | Chan | H04W 8/183 |
| 2022/0116816 | A1 * | 4/2022 | Liang | H04W 48/04 |
| 2022/0150783 | A1 * | 5/2022 | Jin | H04W 48/18 |
| 2022/0166667 | A1 * | 5/2022 | Celozzi | H04W 48/14 |
| 2022/0174587 | A1 * | 6/2022 | Soryal | H04W 48/18 |
| 2022/0201601 | A1 * | 6/2022 | Cai | H04W 8/20 |
| 2022/0217610 | A1 * | 7/2022 | Zheng | H04L 45/64 |
| 2022/0225199 | A1 * | 7/2022 | Futaki | H04W 36/0022 |
| 2022/0271992 | A1 * | 8/2022 | Verma | H04W 48/18 |
| 2022/0386186 | A1 * | 12/2022 | Hu | H04W 36/0061 |
| 2022/0408162 | A1 * | 12/2022 | Jia | H04N 21/6408 |
| 2023/0114120 | A1 * | 4/2023 | You | H04W 88/085 |
| | | | | 370/328 |
| 2023/0135831 | A1 * | 5/2023 | Guionnet | H04L 41/122 |
| | | | | 709/223 |
| 2023/0140659 | A1 * | 5/2023 | Zhang | H04L 41/0894 |
| | | | | 370/252 |
| 2023/0164639 | A1 * | 5/2023 | Zhang | H04W 28/16 |
| | | | | 370/312 |
| 2023/0164640 | A1 * | 5/2023 | Jia | H04W 76/32 |
| | | | | 370/331 |
| 2023/0179638 | A1 * | 6/2023 | Hu | H04L 63/20 |
| | | | | 726/1 |
| 2023/0284121 | A1 * | 9/2023 | Wang | H04W 60/00 |
| | | | | 370/328 |
| 2024/0031926 | A1 * | 1/2024 | Tukmanov | H04L 41/0895 |
| 2025/0024404 | A1 * | 1/2025 | Wang | H04W 60/04 |
| 2025/0159586 | A1 * | 5/2025 | Shen | H04W 24/02 |

OTHER PUBLICATIONS

3GPP Specification Compliance for PCF Interfaces; https://www.cisco.com/c/en/US/td/docs/wireless/ucc/pcf/5G-PCF_Configuration_Admin_Guide/m_pcf_3gpp_compliance.pdf; undated, downloaded Jan. 13, 2021; pp. 1-4.

Cloud infrastructure; https://www.ericsson.com/en/future-technologies/architecture/network-architecture-domains; undated, downloaded Jan. 13, 2021; pp. 1-22.

IP Multimedia Subsystem; https://en.wikipedia.org/wiki/IP_Multimedia_Subsystem; Jan. 8, 2021; pp. 1-16.

Operations, administration and management; https://en.wikipedia.org/wiki/Operations,_administration_and_management; Nov. 4, 2020; pp. 1-4.

Oracle Help Center; Network Slice Selection Function (NSSF) Cloud Native User's Guide; https://docs.oracle.com/en/industries/communications/cloud-native-core/2.2.1/nssf/introduction1.html#; undated, downloaded Jan. 13, 2021; pp. 1-10.

OSS/BSS; https://en.wikipedia.org/wiki/OSS/BSS; Mar. 1, 2020; 1 page.

Release 17; https://www.3gpp.org/release-17; Dec. 12, 2020; pp. 1-2.

Specification # 32.868; https://portal.3gpp.org/desktopmodules/Specifications/SpecificationDetails.aspx?specificationId=3277; undated, downloaded Jan. 13, 2021; 1 page.

Unified Data Manager (UDM) User's Guide; https://docs.oracle.com/communications/F25434_01/docs.10/UDM%20User%27s%20Guide/GUID-F0678B8F-501C-4BE5-A0D7-141CED2DFE70.htm; undated, downloaded Jan. 13, 2021; 1 page.

What is 5G Network Slicing?; https://www.sdxcentral.com/5g/definitions/5g-network-slicing/; Jan. 2, 2018; pp. 1-6.

What is an Open Radio Access Network (O-RAN) ?; https://www.metaswitch.com/knowledge-center/reference/what-is-an-open-radio-access-network-o-ran#; undated, downloaded Jan. 13, 2021; pp. 1-5.

What is the 5G Access and Mobility Management Function (AMF) ?; https://www.metaswitch.com/knowledge-center/reference/what-is-the-5g-access-and-mobility-management-function-amf; undated, downloaded Jan. 13, 2021; pp. 1-4.

What is the 5G Session Management Function (SMF)?; https://www.metaswitch.com/knowledge-center/reference/what-is-the-5g-session-management-function-smf; undated, downloaded Jan. 13, 2021; pp. 1-6.

Where did the 5G Nef come from ?; https://apistraining.com/news/5g-nef/; Feb. 14, 2019; pp. 1-6.

Marappan, Satheesh et al., NWDAF: Automating the 5G network with machine learning and data analytics; https://inform.tmforum.org/insights/2020/06/nwdaf-automating-the-5g-network-with-machine-learning-and-data-analytics/; Jun. 2020; pp. 1-11.

Pathak, Rajarshi, The challenge of policy and charging control in a 5G network; https://disruptive.asia/challenge-of-policy-charging-control-5g-network/; Dec. 10, 2019; pp. 1-7.

* cited by examiner

200a

Figure 2B:
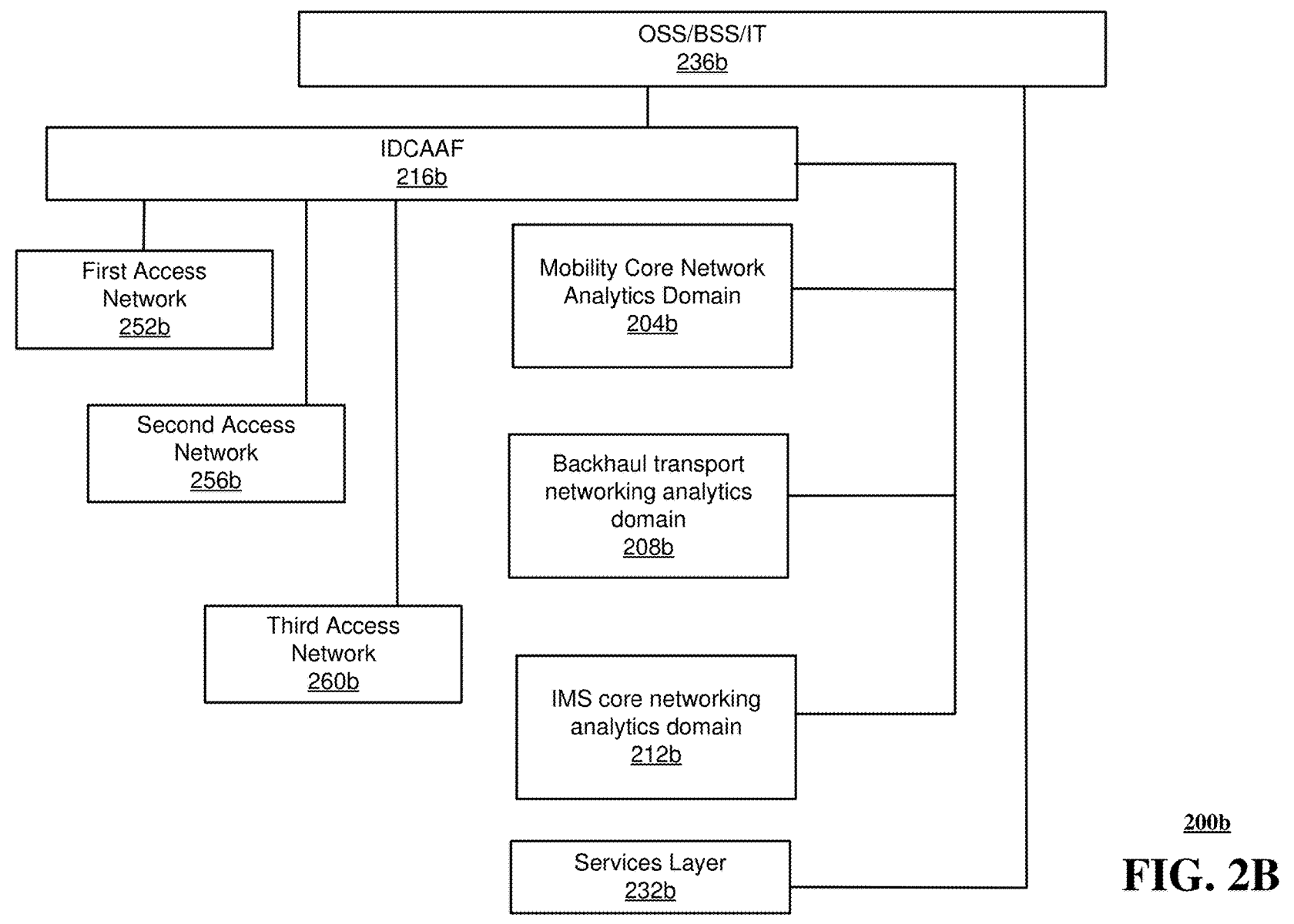

OSS/BSS/IT
236b

IDCAAF
216b

Mobility Core Network Analytics Domain
204b

Backhaul transport networking analytics domain
208b

IMS core networking analytics domain
212b

Services Layer
232b

First Access Network
252b

Second Access Network
256b

Third Access Network
260b

202d — Monitor activities; obtain data representative of the activities

206d — Analyze the data

210d — Identify action(s) based on the analysis of the data

214d — Generate and issue command(s) based on the identification of the action(s)

200d

300

600

APPARATUSES AND METHODS FOR FACILITATING AUTOMATED INTERDOMAIN COMMUNICATIONS ANALYTICS AUTOMATION FUNCTIONALITY AND PROFILING

FIELD OF THE DISCLOSURE

The subject disclosure relates to apparatuses and methods for facilitating automated interdomain communications analytics automation functionality and profiling.

BACKGROUND

Communication networks, such as mobile networks, are typically designed to handle a set of common scenarios related to network operations, network security, and optimizations. Many of these common scenarios are captured in, or supported by standards, protocols, and the like. However, there are scenarios that depend more on local deployment, specific carrier network environments, and/or traffic trends which typically are not considered by standard bodies or equipment vendors. Often these scenarios are temporary/transient in nature and require quick/rapid remedies that cannot wait on the long development cycle of the standard bodies and equipment vendors. In addition, the detection of such scenarios frequently relies on information that is specific to the carrier environment or a local deployment. As a further item of complexity, functionality within networks is frequently allocated to different network domains/subsystems, such as for example a core network, an access network, etc. An efficient management of resources may require considerations in more than one domain. Still further, the different mobility architecture generations (e.g., 3G, 4G, 5G, etc.) may tend to work independently from each other; the monitoring capabilities may be separated from one another (e.g., are often separated geographically) such that visibility may be limited to a certain region (e.g., northeast, southwest). There may be performance and scalability considerations while monitoring a network or a part of the network. For example, some monitoring and analytics, automation functionality might be appropriately driven to the edge, closer to a network element, while other monitoring and analytics, automation functionality may require a holistic view of an entire network.

BRIEF DESCRIPTION OF THE DRAWINGS

Reference will now be made to the accompanying drawings, which are not necessarily drawn to scale, and wherein:

FIGS. 2A-2C are block diagrams illustrating example, non-limiting embodiments of systems functioning within the communication network of FIG. 1 in accordance with various aspects described herein.

DETAILED DESCRIPTION

The subject disclosure describes, among other things, illustrative embodiments for generating analytics representative of behaviors or activities/actions in multiple domains and causing actions to be taken in accordance with the analytics. Other embodiments are described in the subject disclosure.

One or more aspects of the subject disclosure include, in whole or in part, monitoring a plurality of activities associated with a plurality of domains, wherein the plurality of domains includes a core domain, an access domain, a transport domain, and a security domain, obtaining, based on the monitoring, data representative of the plurality of activities, identifying at least one action to be taken in a first domain of the plurality of domains based on an analysis of the data, and issuing a command to cause the at least one action to be taken in the first domain.

One or more aspects of the subject disclosure include, in whole or in part, obtaining data from a plurality of domains, wherein the plurality of domains includes a mobility core networking analytics domain, a backhaul transport networking analytics domain, and an Internet Protocol multimedia subsystem (IMS) core networking analytics domain, identifying at least a first action to be taken in at least a first domain of the plurality of domains based on an analysis of the data, and issuing at least a first command to cause the at least a first action to be taken in the at least a first domain.

One or more aspects of the subject disclosure include, in whole or in part, analyzing data associated with a plurality of network domains, identifying, based on the analyzing of the data, a first action to be taken in a first network domain of the plurality of network domains, identifying, based on the analyzing of the data, a second action to be taken in a second network domain of the plurality of network domains, issuing a first directive to the first network domain to cause a first communication device in the first network domain to take the first action, and issuing a second directive to the second network domain to cause a second communication device in the second network domain to take the second action.

Figure 1:
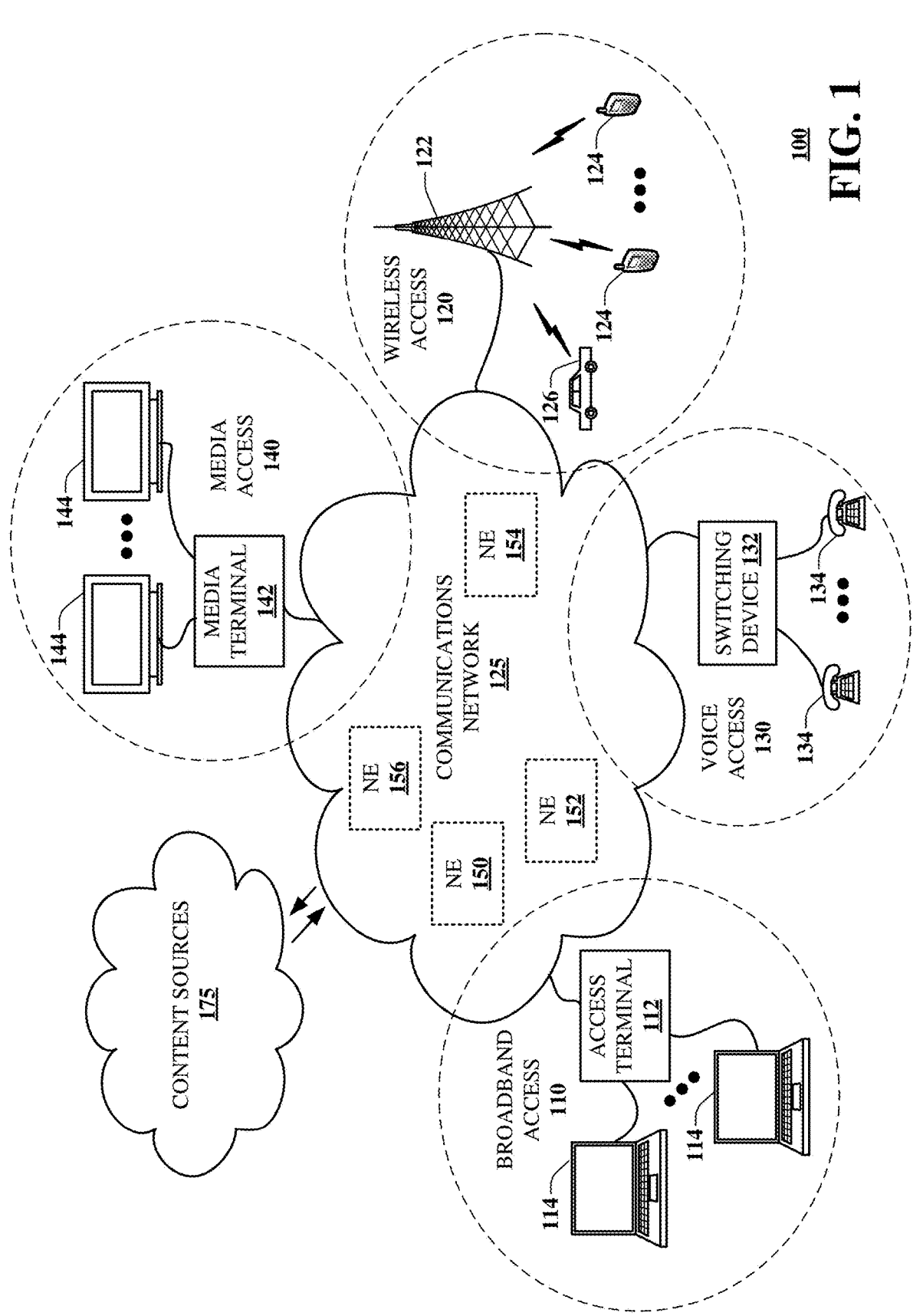
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part monitoring a plurality of activities associated with a plurality of domains, wherein the plurality of domains includes a core domain, an access domain, a transport domain, and a security domain, obtaining, based on the monitoring, data representative of the plurality of activities, identifying at least one action to be taken in a first domain of the plurality of domains based on an analysis of the data, and issuing a command to cause the at least one action to be taken in the first domain. System 100 can facilitate in whole or in part obtaining data from a plurality of domains, wherein the plurality of domains includes a mobility core networking analytics domain, a backhaul transport networking analytics domain, and an Internet Protocol multimedia subsystem (IMS) core networking analytics domain, identifying at least a first action to be taken in at least a first domain of the plurality of domains based on an analysis of the data, and issuing at least a first command to cause the at least a first action to be taken in the at least a first domain. System 100 can facilitate in whole or in part analyzing data associated with a plurality of network domains, identifying, based on the analyzing of the data, a first action to be taken in a first network domain of the plurality of network domains, identifying, based on the analyzing of the data, a second action to be taken in a second network domain of the plurality of network domains, issuing a first directive to the first network domain to cause a first communication device in the first network domain to take the first action, and issuing a second directive to the second network domain to cause a second communication device in the second network domain to take the second action.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices

134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
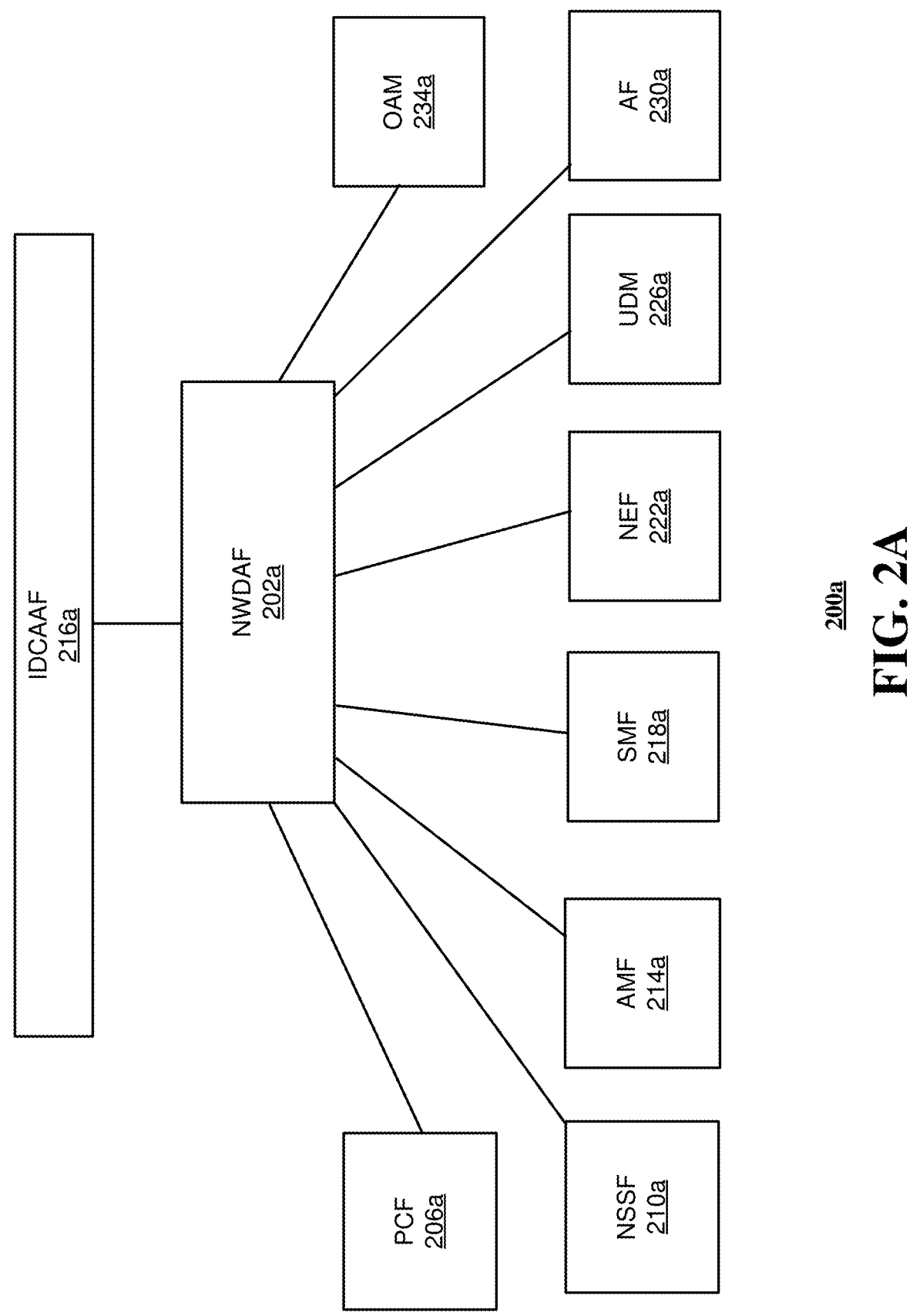

FIG. 2A is a block diagram illustrating an example, non-limiting embodiment of a system 200*a*. The system 200*a* may function within, or may be operatively overlaid upon, the communication network 100 of FIG. 1 in accordance with various aspects described herein. The system 200*a* may correspond to a portion of a core domain associated with a communication network, such as a 5G network. While referenced with respect to the core domain, one skilled in the art would appreciate, based on a review of this disclosure, that aspects of the system 200*a* may be extended to, or implemented in conjunction with, other domains of a network. For example, aspects of the system 200*a* may be applied with respect to an access domain, a transport domain, a network slicing domain, a security domain, an accounting/billing domain, an operations support system (OSS) domain, a services domain (potentially inclusive of functions based on IMS, messaging, applications/application support, etc.), etc. Still further, aspects of this disclosure (such as aspects of the system 200*a*) may pertain to control plane functionality and/or user plane functionality.

As shown in FIG. 2A, the system 200*a* may include a network data analytics function (NWDAF) 202*a*. The NWDAF 202*a* may be communicatively coupled with one or more devices or components that may support/facilitate various functionalities. By way of illustration, such functionalities may include: a policy control function (PCF) 206*a*, a network slice selection function (NSSF) 210*a*, an access and mobility management function (AMF) 214*a*, a session management function (SMF) 218*a*, a network exposure function (NEF) 222*a*, a unified data management (UDM) function 226*a*, an application function (AF) 230*a*, and an operations, administration and management/maintenance (OAM) function 234*a*. The functionality facilitated/supported/provided by the various functions 206*a*-234*a* would be understood/appreciated by one skilled in the art. Accordingly, a complete description of those functions is omitted herein for the sake of brevity.

The NWDAF 202*a* may obtain information/data from one or more of the functions 206*a*-234*a*. The NWDAF 202*a* may analyze the obtained data to identify values for one or more parameters for managing or controlling one or more communication networks. The NWDAF 202*a* may generate and provide one or more commands or directives to one or more of the functions 206a-234a (or one or more communication devices, such as one or more communication devices associated with the functions 206a-234a and/or the system 200a) to obtain such management/control of the communication network(s). The process of the functions 206a-234a providing the data to the NWDAF 202a, the NWDAF 202a analyzing the data, and the NWDAF 202a providing the commands/directives may be repeated (potentially in conjunction with an execution of one or more algorithms, such as for example one or more algorithms based on machine learning and/or artificial intelligence techniques/technologies), such that performance or efficiency within the communication network(s) may be enhanced/increased (e.g., optimized) over time. By virtue of the arrangement and operations facilitated by the system 200a, a closed-loop may be established whereby the NWDAF 202a may be responsive to changing events or conditions pertaining to the communication network(s).

By way of introduction, the NWDAF 202a may be coupled to an interdomain communications analytics automation function (IDCAAF) 216a. The IDCAAF 216a may process data and/or analytics obtained from various functions (e.g., the functions 206a-234a), directly or by way of the NWDAF 202a, and may issue commands/directives to one or more of the various functions (e.g., the functions 206a-234a), directly or by way of the NWDAF 202a.

Referring now to FIG. 2B, an illustrative embodiment of a system 200b is shown. The system 200b may function within, or may be operatively overlaid upon, the communication network 100 of FIG. 1 in accordance with various aspects described herein. In some embodiments, the system 200b may incorporate aspects of the system 200a of FIG. 2A.

As shown in FIG. 2B, the system 200b may include a mobility core network analytics domain 204b, a backhaul transport networking analytics domain 208b, and an Internet Protocol multimedia subsystem (IMS) core networking analytics domain 212b. Each of the domains 204b-212b may process data and generate analytics that are pertinent to each of the respective domains 204b-212b (e.g., mobility, backhaul transport, and IMS, respectively). Still further, each of the domains 204b-212b may generate and provide/issue commands/directives that are specific to the respective domain, where such commands/directives may be based on the analytics generated by the respective domain.

In some embodiments, one or more of the domains 204b-212b may provide data and/or analytics (such as analytics generated by the respective domain, analytics obtained by the respective domain from one or more other domains, etc.) to an IDCAAF 216b (where the IDCAAF 216b may incorporate one or more aspects of the IDCAAF 216a of FIG. 2A). The IDCAAF 216b may process the data and/or analytics obtained from the various domains and may issue commands/directives to one or more of the various domains (e.g., the domains 204b-212b). In this respect, the IDCAAF 216b may oversee and/or regulate/manage operations/functions in the various domains 204b-212b (via the commands/directives issued by the IDCAAF 216b) with a higher-level perspective than is available within the domains 204b-212b taken individually.

To illustratively demonstrate a role of the IDCAAF 216b, in an exemplary scenario it may be assumed that a nefarious actor (or a communication device associated therewith) is attempting to penetrate a communication network associated with the IDCAAF 216b without authorization. In an attempt to avoid raising suspicion, the actor may attempt to penetrate the communication network in a distributed manner/fashion. For example, the actor may attempt to penetrate or compromise network resources that are managed across the various domains 204b-212b. The actor's actions in respect of each of the domains, when taken individually in each of the domains, might not appear to depart from routine network behaviors/activities in an amount greater than a threshold. However, on a more global level/perspective across the collective of the domains, the actions (as identified by the IDCAAF 216b) may signify that a distributed attack upon the communication network (e.g., across the various domains) is underway. Based on identifying such a distributed attack, the IDCAAF 216b may issue commands/directives directed to mitigating the impact of the attack. For example, the IDCAAF 216b may issue commands/directives that allocate resources to network security operations/functions to attempt to thwart/repel the attack.

As represented in FIG. 2B, the system 200b may include/incorporate one or more layers, such as a services layer 232b. The services layer 232b may be responsible for administering one or more services in the communication network(s). In some embodiments, the services layer 232b may oversee/manage an execution of one or more applications by one or more communication devices, such as for example a user equipment (UE). The services layer 232b may maintain or utilize/access one or more profiles that may administer services in accordance with one or more preferences (e.g., user preference, device preferences/capabilities, etc.).

In some embodiments, the IDCAAF 216b and/or the services layer 232b may be communicatively coupled to an operations support system/business support system/information technology (OSS/BSS/IT) subsystem 236b. The OSS/BSS/IT subsystem 236b may oversee aspects of the communication network(s) directed to: operations (e.g., order management, network inventory management, and network operations), business (e.g., order capture, customer/subscriber relationship management, and billing/invoicing), and/or information technology (e.g., hardware/software/version controls, technical support, testing/troubleshooting, device management, etc.). In some embodiments, the aspects overseen by the OSS/BSS/IT subsystem 236b may conform to, or be included/incorporated in, one or more regulations or policies established and/or maintained by the OSS/BSS/IT subsystem 236b. In this regard, in some embodiments operations and/or functionality provided by the IDCAAF 216b and/or the services layer 232b may be required to conform to the regulations/policies of the OSS/BSS/IT subsystem 236b.

As described above, the IDCAAF 216b may generate commands/directives in respect of one or more networks. For example, and as shown in FIG. 2B, the IDCAAF 216b may generate commands/directives in respect of a first access network 252b, a second access network 256b, and a third access network 260b. In some embodiments, the access networks 252b-260b may utilize/incorporate different technologies. For example, in an illustrative embodiment the first access network 252b may correspond to an LTE radio access network, the second access network 256b may correspond to a 5G radio access network, and the third access network 260b may correspond to an open-radio access network (O-RAN) architecture with variants of LTE, 5G technologies using standards-based interfaces.

In some embodiments, elements of the system 200b may be instantiated in, or may be included as a part of, one or more private, public, and/or cloud-based networks. Operations associated with network functions deployed as part of network infrastructure may vary (e.g., may be adapted) based on dynamic network, service, user, and/or location-based events/conditions. In some embodiments, operations may be tailored/customized to obtain/achieve/realize one or more key performance indicators (KPIs) and/or thresholds/metrics associated with a quality of service (QoS) and/or a quality of experience (QoE). To achieve such KPIs or metrics, the IDCAAF 216$b$ may be anchored as a proxy for communication and cooperation with several network centric domains (such as the domains illustrated in FIG. 2B) and work with services and/or IT layers to enhance QoS/QoE.

Figure 2C:
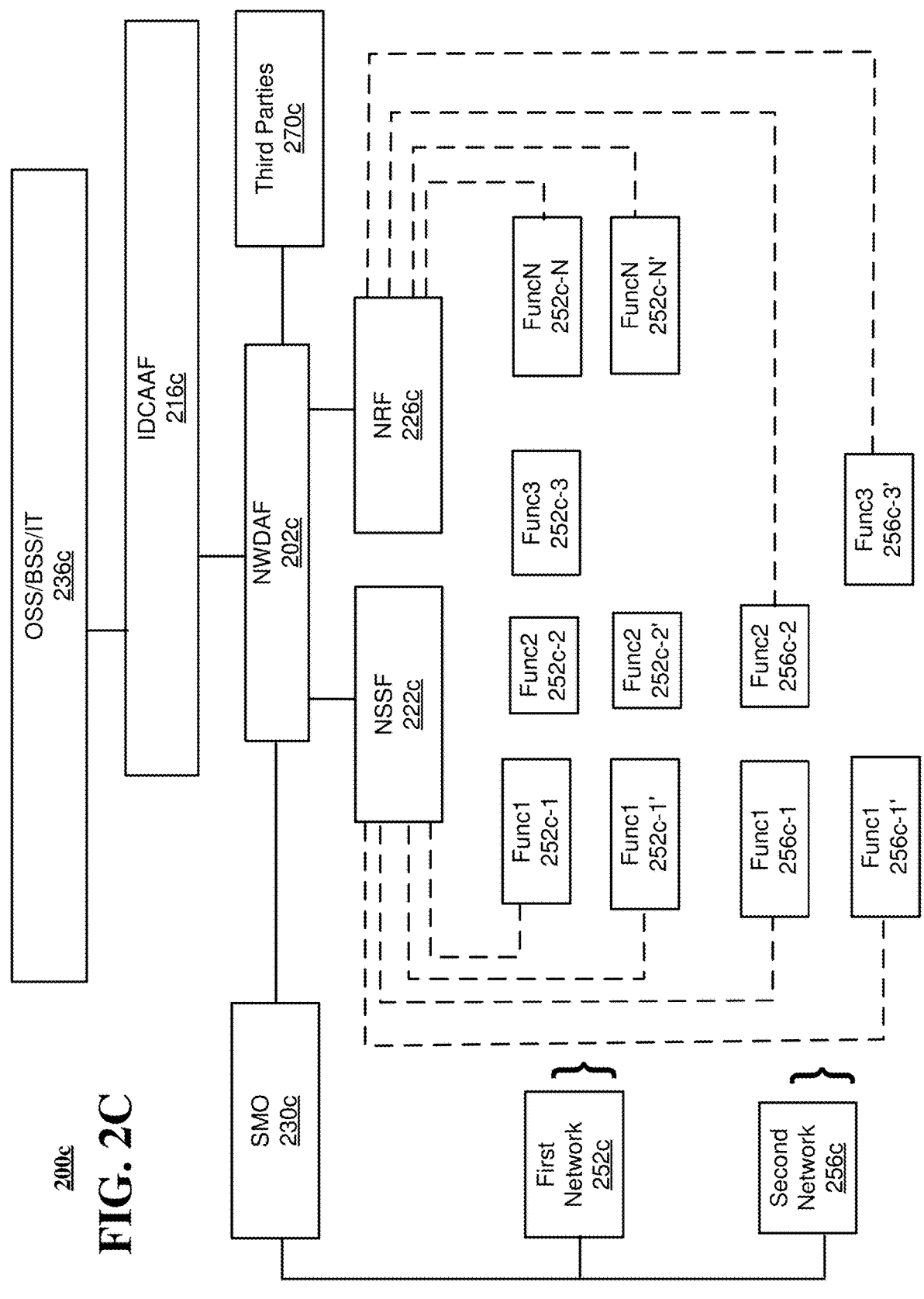

Referring now to FIG. 2C, an illustrative embodiment of a system 200$c$ is shown. The system 200$c$ may function within, or may be operatively overlaid upon, the communication network 100 of FIG. 1 in accordance with various aspects described herein. In some embodiments, the system 200$c$ may incorporate aspects of the system 200$a$ of FIG. 2A and/or the system 200$b$ of FIG. 2B.

The system 200$c$ may include a NWDAF 202$c$ (which may include or incorporate aspects of the NWDAF 202$a$ of FIG. 2A), an IDCAAF 216$c$ (which may include or incorporate aspects of the IDCAAF 216$a$ of FIG. 2A and/or the IDCAAF 216$b$ of FIG. 2B), and/or an OSS/BSS/IT subsystem 236$c$ (which may include or incorporate aspects of the OSS/BSS/IT subsystem 236$b$ of FIG. 2B). The NWDAF 202$c$ may be communicatively coupled with the IDCAAF 216$c$, which in turn may be communicatively coupled with the OSS/BSS/IT subsystem 236$c$.

The NWDAF 202$c$ may be communicatively coupled with a network slice selection function (NSSF) 222$c$ and/or a network repository function (NRF) 226$c$. The NSSF 222$c$ may be responsible for managing network resource allocations to achieve/obtain various performance criteria (e.g., service level agreement criteria), such as connectivity, reliability, speed, and capacity. The NRF 226$c$ may include functionality to find/discover network functions and services to support, e.g., the establishment of one or more sessions (such as a protocol data unit [PDU] session).

In the context of an administration, management, or provisioning of a social media service/application, the NWDAF 202$c$ may be coupled with a service management orchestration (SMO) subsystem 230$c$. The SMO subsystem 230$c$ may incorporate algorithms to identify outlets or communities to generate interest in respect of one or more platforms, products, services, brands, events, etc. In some embodiments, the SMO subsystem 230$c$ may include or incorporate aspects of search engine optimization (SEO) and/or search engine advertising (SEA) to facilitate generating interest in, or awareness of, the social media service/application.

The SMO subsystem 230$c$ may utilize or interface with one or more networks, such as for example a first network 252$c$ and a second network 256$c$. In some embodiments, the first network 252$c$ and the second network 256$c$ may utilize a common radio technology. In some embodiments, the first network 252$c$ may utilize a first radio technology and the second network may utilize a second radio technology that is different from the first radio technology.

The first network 252$c$ and/or the second network 256$c$ may support or administer a number 'N' of functions (Func). For example, and without limitation, the functions (illustratively, a first function Func1, a second function Func2, a third function Func3, . . . an N$^{th}$ function FuncN) referred to in FIG. 2C may include: one or more of the (core) functions of FIG. 2A, a user/data plane function (UPF), an authentication server function (AUSF), or any combination thereof.

Functions provided by, or in conjunction with, the first network 252$c$ and/or the second network 256$c$ may be administered or supported via a network slice topology/arrangement. For example:

a first slice associated with the first network 252$c$ may include an instance of the first function Fun1 252$c$-1, an instance of the second function Func2 252$c$-2, an instance of the third function Func3 252$c$-3, and an instance of the N$^{th}$ function FuncN 252$c$-N;

a second slice associated with the first network 252$c$ may include an instance of the first function Fun1 252$c$-1', an instance of the second function Func2 252$c$-2', and an instance of the N$^{th}$ function FuncN 252$c$-N';

a first slice associated with the second network 256$c$ may include an instance of the first function Fun1 256$c$-1 and an instance of the second function Func2 256$c$-2; and a second slice associated with the second network 256$c$ may include an instance of the first function Fun1 256$c$-1' and an instance of the third function Func3 256$c$-3'.

Each of the slices referenced above may be based on one or more factors or considerations, such as for example an identification of: network loads, processing loads, communication device capabilities, communication sessions, user preferences, mobility, location (e.g., geographical location), media consumed or requested, online activities (e.g., social media activities), environmental factors/considerations (e.g., obstacles in a line-of-sight in respect of a communication device, temperature, wind, humidity, etc.), etc. While two slices are shown and described above in respect of each of the first network 252$c$ and the second network 256$c$, the count of slices for a given network may be different from two in some embodiments. Still further, in some embodiments the number of slices within (or associated with) a given network may be dynamic in nature and may be adapted based on one or more factors or considerations, such as the factors/considerations set forth above. In this regard, existing slices may be modified/updated or destroyed/disbanded/discarded/purged, and new slices may be generated/created/invoked/instantiated. Similarly, the availability or use of one or more functions within a given slice (of a given network) may be dynamic in nature and may be adapted based on one or more factors or considerations. Stated differently, the allocation/utilization of the various functions (Func) associated with a given slice shown in FIG. 2C may be representative of a snapshot-in-time, such that at other points in time the allocation/utilization of the various functions within a given slice may be different from what is explicitly shown—e.g., functions may be added/invoked/instantiated, removed/discarded/disbanded/destroyed, and/or modified/updated.

In some embodiments, decisions or determinations may be facilitated by, e.g., the NWDAF 202$c$ based on inputs obtained from third parties 270$c$. For example, the third parties 270$c$ may include: users of the first network 252$c$ and/or the second network 256$c$, operators of other networks, media or content item creators, advertisers, distributors, etc. In some embodiments, the NWDAF 202$c$ may drive resource allocation decisions (as embodied in the aforementioned functions supported/hosted by the slices) in respect of the first network 252$c$ and/or the second network 256$c$ based on an analysis of the inputs obtained from the third parties 270$c$.

As set forth above, various aspects of this disclosure may associate radio access network (RAN)-core domain-specific elements with elements associated with transport, IMS core, and/or OSS/BSS/IT domains. Furthermore, aspects of this disclosure may be used to define how the various elements interact with one another to achieve enhanced visibility into overall network performance, efficiency, management, regulation, and administration. Still further, closed-loop monitoring and adjustments may be provided/facilitated to address deficiencies before they become problematic (e.g., before the deficiencies impose consequences in an amount or an extent that is greater than a threshold), while simultaneously respecting boundaries in terms of allocated responsibilities and functionalities.

As described above, aspects of this disclosure may be utilized in relation to improving or enhancing QoS or QoE. Such an improvement/enhancement may be expressed or manifested in relation to enhancing, e.g., voice quality, video quality, messaging response times (e.g., a reduction in latency), augmented reality/virtual reality (AR/VR) experiences, etc.

Aspects of this disclosure may provide additional insight or visibility into KPIs or metrics associated with one or more communication networks and/or communication devices. For example, aspects of the disclosure may provide insight into core network capacity utilization, core network success and/or failure metrics, IMS core network metrics, transport network metrics, OSS/BSS/IT metrics, security metrics, billing/accounting metrics, etc. One or more decisions or determinations may be made based on an analysis of such metrics.

Aspects of the disclosure may provide insight into UE contexts that might otherwise have gone undiscovered in the absence of the instant disclosure. To demonstrate, the UE contexts may include identifications of device types, patterns, or behaviors in terms of mobility/location, states/status of devices (e.g., connected, idle, detached, actively connected, etc.), etc.

Aspects of the disclosure may serve to identify network loads, RAN congestion, etc. Still further, aspects of the disclosure may identify such network loads or congestion in one or more dimensions, or based on one or more parameters, such as for example geographical location, time of day, device type, etc.

Aspects of the disclosure are directed to enhancing/improving the security of networks. Aspects of the disclosure may provide insight into algorithms that are used (inclusive of an identification of any vulnerabilities that may be present), device signatures (which may be facilitated via the use of one or more keys), identifications of suspicious (e.g., rogue) devices, origins of communications or activities, etc.

As set forth above, aspects of the disclosure may employ/utilize a sliced network topology as part of administering an application or service. Slices may be differentiated or distinguished from one another based on the functions that a given slice provides/supports/utilizes/hosts.

Aspects of the disclosure may be utilized in relation to one or more applications or contexts. For example, aspects of the disclosure may be implemented in relation to a provisioning of content/media, advertising, gaming (e.g., online gaming), automotive applications (e.g., driverless vehicle applications), AR/VR experiences, etc.

As described above, aspects of the disclosure may be utilized to monitor network performance, resource utilization, etc. Patterns in data may be identified, where the identification of such patterns may trigger a generation and issuance of one or more commands/directives for one or more actions to be taken. In this respect, aspects of the disclosure may be proactive in nature, and may address deficiencies before they rise to a level that proves problematic. Responses to such actions, as commanded, may be monitored to ensure that the actions have a desired/intended impact/effect; additional commanded actions may be provided to further address deficiencies as circumstances warrant.

Aspects of the disclosure may be applied in connection with one or more communication/signaling standards, protocols, technologies, or the like. For example, aspects of this disclosure may be applied in relation to: one or more releases/versions of the Third Generation Partnership Project (3GPP), cable or satellite networks, WiFi technologies, Bluetooth technologies, near field communications (NFC), etc.

Aspects of the disclosure include architectures and platforms that interconnect cross domain intelligence of monitoring and analytic functions to support decision-making processes. Closed-loop, automated processes are included/facilitated by this disclosure. Aspects of the disclosure may be applied in respect of flat (e.g., horizontal) or hierarchical (e.g., vertical) implementations. To demonstrate, aspects of a "flat implementation" may be applied to a peer-to-peer network, whereby respective peer devices may regulate one another without a central chain-of-command. Conversely, in respect of a "hierarchical implementation" a network element may respond to (e.g., may take actions in accordance with) commands issued by a controller, for example.

Aspects of the disclosure may be applied in respect of one or more operations, such as for example data transfer operations, network security operations, and resource allocation operations (e.g., resource allocation optimizations). Decision-making in respect of such operations may be based on an analysis of data obtained across/from one or more networks and/or one or more domains within a network or set of networks.

Figure 2D:
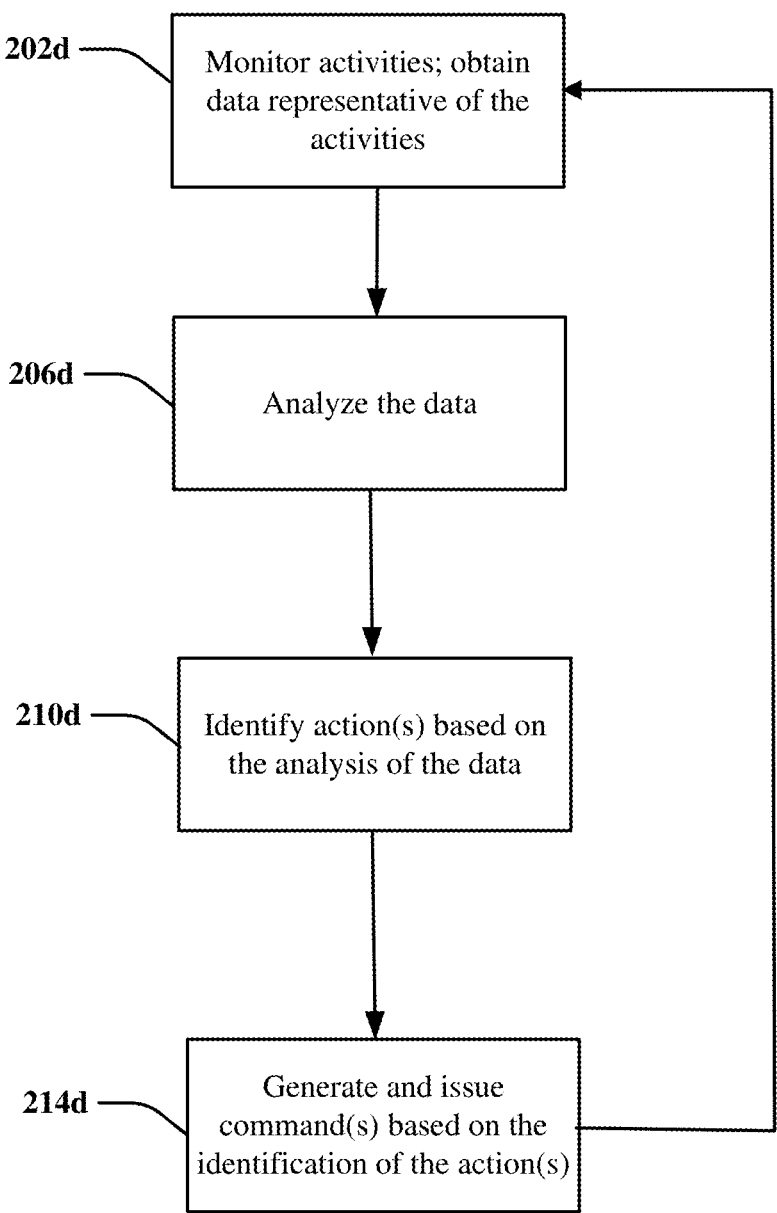
FIG. 2D depicts an illustrative embodiment of a method in accordance with various aspects described herein.

Referring now to FIG. 2D, an illustrative embodiment of a method 200d in accordance with various aspects described herein is shown. The method 200d may be facilitated (e.g., executed, etc.) by one or more systems, devices, and/or components, such as for example the systems, devices, and components set forth herein. The method 200d may be implemented to facilitate an execution of one or more operations, as described in further detail below in relation to the blocks of the method 200d.

In block 202d, activities of one or more communication devices may be monitored. For example, in the context of a cellular network, block 202d may include a monitoring device (e.g., a snooper) monitoring/examining packets of traffic traversing the network. As part of block 202d, data may be obtained that is representative of the monitored activities. For example, block 202d may include generating the data in the first instance and/or receiving the data (potentially as part of one or more reports or the like).

The operations of block 202d may be executed in parallel amongst multiple devices or entities. To demonstrate, and continuing the abovementioned example of a cellular network, as part of block 202 a respective monitoring device located in each cell of a plurality of cells may perform a monitoring of communication device activity within the given cell. In some embodiments, aspects of block 202d may be executed in a sequential manner, such as for example where a second operation (e.g., a handover) associated with the monitoring is dependent on an output (e.g., a signal strength) associated with a first operation (e.g., a monitoring of the signal strength).

The operations of block 202d may occur or execute across one or more domains. For example, activities/actions associated with a core network, an access network, a transport network, a security network, etc., may be monitored and data representative of those activities/actions in each of the respective domains may be obtained. The operations of block 202*d* may be applied in respect of one or more radio access technologies (RATs) and/or one or more radio access networks (RANs)

In block 206*d*, the data of block 202*d* may be analyzed. For example, as part of block 206*d* one or more algorithms (e.g., an algorithm based on machine learning and/or artificial intelligence, a statistics-driven algorithm, etc.) may be applied to the data to identify, e.g., patterns in the data, anomalies in the data (e.g., a value contained within the data exceeding a threshold), an absence/lack of a subset of data that was expected to be contained within the data (which may be indicative of an inoperability of one or more devices), etc. The analysis of block 206*d* may facilitate a generation of one or more reports, messages, signals, or the like. The analysis of block 206*d* may be based on one or more inputs, such as for example inputs obtained from third parties (see, e.g., third parties 270*c* of FIG. 2C).

In block 210*d*, one or more actions to take may be identified based on the analysis of the data in block 206*d*. One or more of the actions identified as part of block 210*d* may be applied to a plurality of domains on a universal basis—e.g., all such domains are identified as having to take the action(s). In some instances, one or more of the actions identified as part of block 210*d* may be applied to some, but less than all, of the plurality of domains. In some instances, one or more of the actions identified as part of block 210*d* may be applied or selected with respect to an individual domain.

In block 214*d*, one or more commands/directives may be generated and issued based on the action(s) identified as part of block 210*d*. For example, as part of block 214*d* a command/directive may be provided (e.g., transmitted) to a device associated with a respective domain that is the subject of the action(s). As part of block 214*d*, a first command may be issued to a first domain, and a first device associated with the first domain may generate and issue a second command directed to a second device associated with a second domain based on the first command. Stated slightly differently, aspects of block 214*d* may facilitate a tiered or distributed chain of commands, whereby in this example the first domain may be responsible for (monitoring or overseeing) activities associated with the second domain.

A flow of the method 200*d* may proceed from, e.g., block 214*d* to block 202*d*. In this manner, a closed-loop may be established whereby activities/actions within, e.g., a given domain may be monitored. To the extent that an action as commanded (as part of block 214*d*) has a desired or intended impact within the domain, confirmation of the same may be obtained based on the loop as formed. Conversely, if the action as commanded fails to have a desired or intended impact, opportunities are provided to generate/issue alternative or additional commands as warranted. Based on principles of machine learning and/or artificial intelligence, aspects of the method 200*d* may obtain enhanced or increased intelligence over time, which is to say that any errors (e.g., any errors in commanded actions/activities) may tend to converge towards zero as the method 200*d* is executed over time.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Aspects of this disclosure may overcome limitations in terms of domains and/or networks operating in isolation. To demonstrate, and as some of the examples set forth herein have illustrated, an issue might not be problematic within a given domain or network when taken/viewed in isolation, but may tend to be problematic when combined with another issue or set of issues that is/are present in one or more other domains or networks. Still further, aspects of this disclosure may identify an action to be taken in a first domain or a first network that may enhance the performance or efficiency of one or more other domains or other networks. Similarly, an action taken in a first domain or a first network may provide a remedy to an issue or problem experienced in, e.g., a second domain or a second network (where such issue or problem may include, for example, interference in a second network exceeding a threshold).

Aspects of the disclosure may allocate actions or responsibilities to one or more domains or networks. In some embodiments, decision-making processes or logic may be facilitated by/at locations that are proximal to an edge of a domain or network to, e.g., reduce latency in the implementation of such actions or responsibilities. Conversely, and to the extent that decision-making would benefit from coordination across domains or networks, decision-making processes or logic may be facilitated by/at locations that are further from the edge of the domain or network (such as locations that are proximal or at a central location of a domain or network).

Aspects of the disclosure may result in a generation or creation of commands that may manage or regular one or more communication sessions. For example, an issuance of a command may cause a domain to initiate a handover of a communication session associated with a communication device from a first cell of a cellular network to a second cell of the cellular network. In some embodiments, a transfer of a communication session may include supplementing a first radio access technology with a second radio access technology and/or utilizing the second radio access technology in lieu of the first radio access technology; the second radio access technology may be different from the first radio access technology.

Aspects of the disclosure may facilitate a provisioning of one or more content items to one or more communication devices. In this respect, and based on one or more commands, a domain may be instructed to select different content items for different communication devices. Similarly, advertisements (which may be included in the respective content items) that are selected for communication devices may be different from one communication device to the next. In some embodiments, selection criteria in respect of content items and/or advertisements may be based at least in part on one or more profiles, such as one or more social media profiles.

As set forth herein, aspects of this disclosure may be utilized in conjunction with a provisioning of service to one or more communication devices (and/or users associated with the communication devices). In some embodiments, a communication device and/or a user may conditional be granted access to a service (or, analogously, denied access to a service) based on one or more commands.

In some embodiments, potential security breaches in respect of one or more domains and/or one or more networks may be identified based on an analysis of data. One or more actions may be taken to mitigate the (potential) security breach. For example, the one or more actions may include an allocation of resources to thwart the potential attack/breach and/or mitigate damages in the event of a successful breach/attack.

Aspects of the disclosure may be tied to one or more machines or apparatuses, including one or more machines or apparatuses that may be specifically/particularly programmed or configured to perform one or more of the methodological acts set forth herein. Aspects of this disclosure may transform an article or object from a first state or thing to one or more other states or things. Aspects of this disclosure provide for/generate/create useful, concrete, and tangible results, where such results are demonstrative/indicative/representative of the aspects possessing/including utility and industrial applicability. As set forth herein, aspects of this disclosure improve the functioning of various machines and apparatuses (e.g., computers) as those machines and apparatuses previously existed in respect of subject matter related/similar to the subject matter of this disclosure. Furthermore, aspects of this disclosure represent/include improvements/enhancements vis-à-vis the state of the art as the state of the art existed prior to this disclosure. As demonstrated herein, aspects of the disclosure may be included/incorporated/integrated as part of one or more applications, inclusive of one or more practical applications. Aspects of this disclosure are directed to, and encompass/include, significantly more than laws of nature, physical/natural phenomena, and abstract ideas standing alone. One skilled in the art would appreciate, based on a review of this disclosure, how to make and use the various aspects of this disclosure without having to engage in undue or excessive experimentation.

Figure 3:
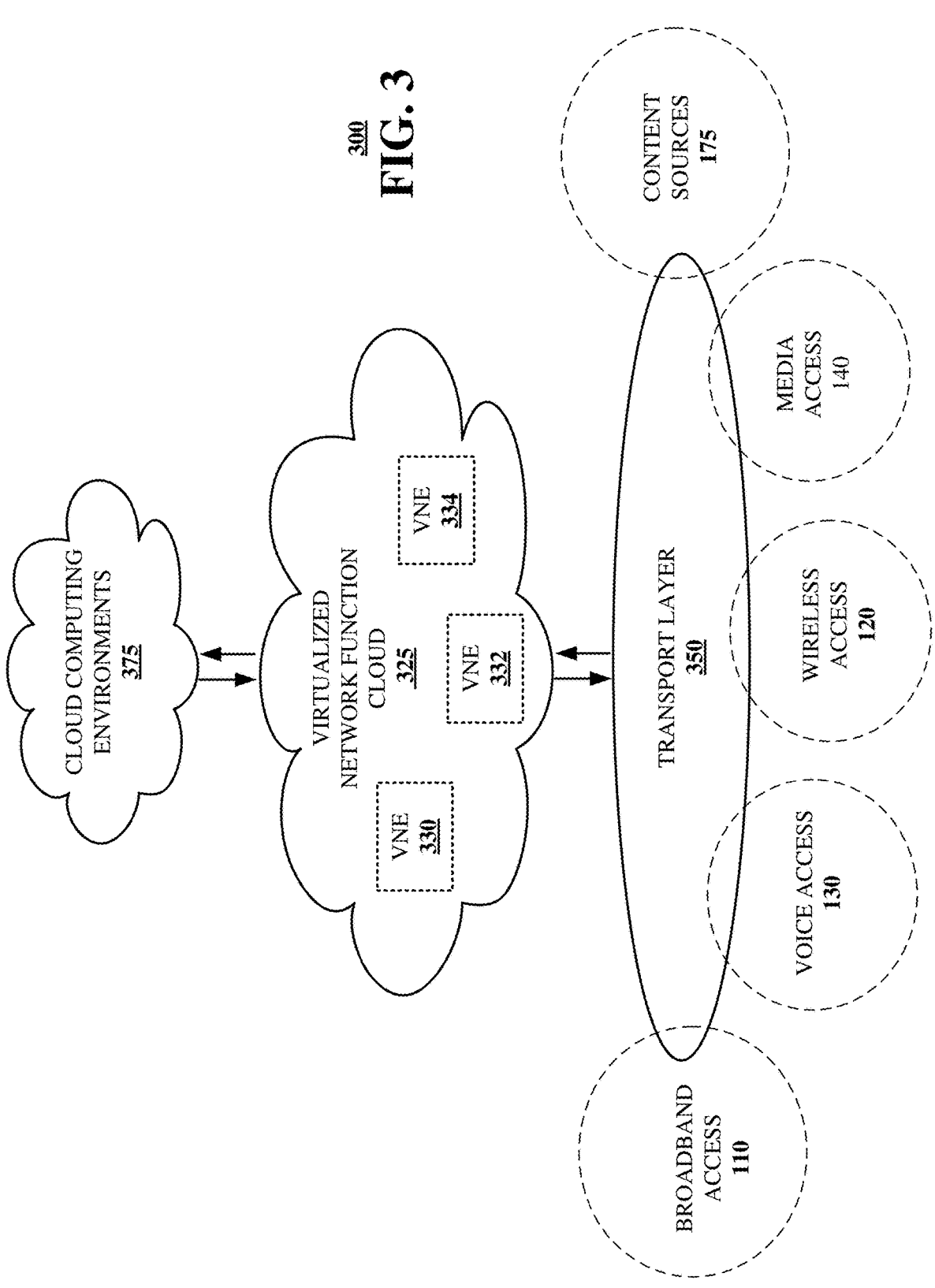
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of systems 200a-200c, and method 200d presented in FIGS. 1, 2A-2C, and 2D. For example, virtualized communication network 300 can facilitate in whole or in part monitoring a plurality of activities associated with a plurality of domains, wherein the plurality of domains includes a core domain, an access domain, a transport domain, and a security domain, obtaining, based on the monitoring, data representative of the plurality of activities, identifying at least one action to be taken in a first domain of the plurality of domains based on an analysis of the data, and issuing a command to cause the at least one action to be taken in the first domain. Virtualized communication network 300 can facilitate in whole or in part obtaining data from a plurality of domains, wherein the plurality of domains includes a mobility core networking analytics domain, a backhaul transport networking analytics domain, and an Internet Protocol multimedia subsystem (IMS) core networking analytics domain, identifying at least a first action to be taken in at least a first domain of the plurality of domains based on an analysis of the data, and issuing at least a first command to cause the at least a first action to be taken in the at least a first domain. Virtualized communication network 300 can facilitate in whole or in part analyzing data associated with a plurality of network domains, identifying, based on the analyzing of the data, a first action to be taken in a first network domain of the plurality of network domains, identifying, based on the analyzing of the data, a second action to be taken in a second network domain of the plurality of network domains, issuing a first directive to the first network domain to cause a first communication device in the first network domain to take the first action, and issuing a second directive to the second network domain to cause a second communication device in the second network domain to take the second action.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
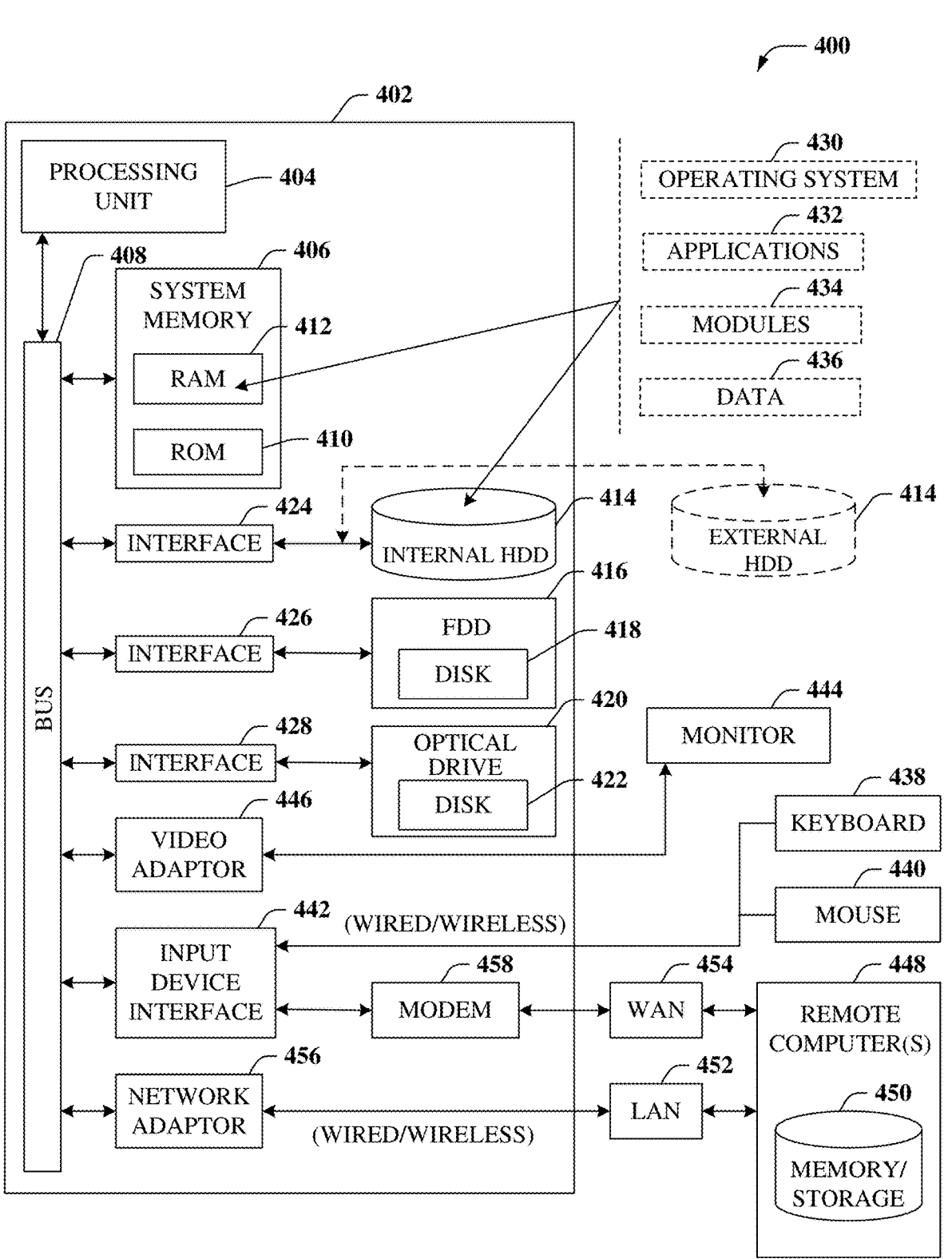
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part monitoring a plurality of activities associated with a plurality of domains, wherein the plurality of domains includes a core domain, an access domain, a transport domain, and a security domain, obtaining, based on the monitoring, data representative of the plurality of activities, identifying at least one action to be taken in a first domain of the plurality of domains based on an analysis of the data, and issuing a command to cause the at least one action to be taken in the first domain. Computing environment 400 can facilitate in whole or in part obtaining data from a plurality of domains, wherein the plurality of domains includes a mobility core networking analytics domain, a backhaul transport networking analytics domain, and an Internet Protocol multimedia subsystem (IMS) core networking analytics domain, identifying at least a first action to be taken in at least a first domain of the plurality of domains based on an analysis of the data, and issuing at least a first command to cause the at least a first action to be taken in the at least a first domain. Computing environment 400 can facilitate in whole or in part analyzing data associated with a plurality of network domains, identifying, based on the analyzing of the data, a first action to be taken in a first network domain of the plurality of network domains, identifying, based on the analyzing of the data, a second action to be taken in a second network domain of the plurality of network domains, issuing a first directive to the first network domain to cause a first communication device in the first network domain to take the first action, and issuing a second directive to the second network domain to cause a second communication device in the second network domain to take the second action.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
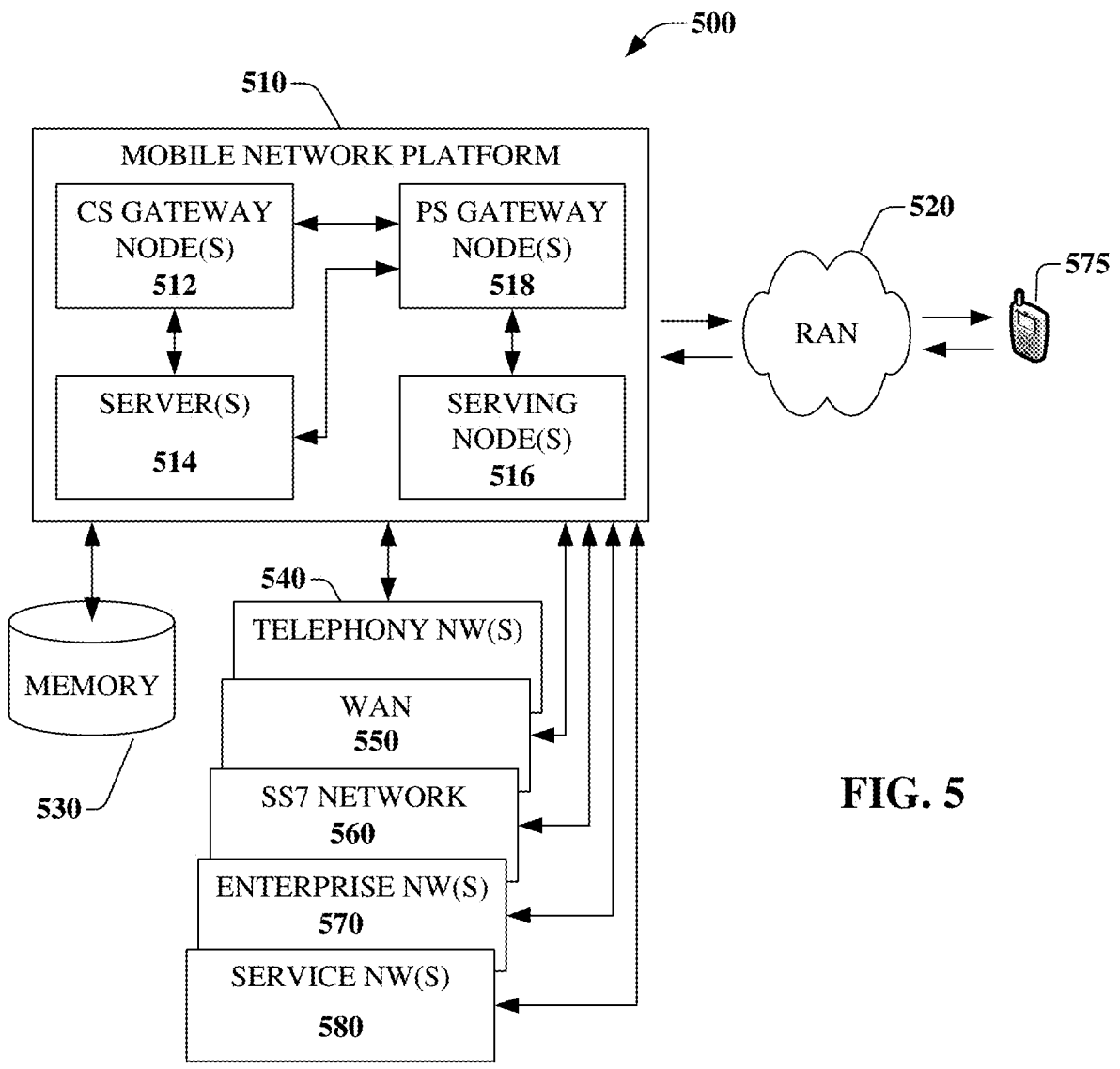
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part monitoring a plurality of activities associated with a plurality of domains, wherein the plurality of domains includes a core domain, an access domain, a transport domain, and a security domain, obtaining, based on the monitoring, data representative of the plurality of activities, identifying at least one action to be taken in a first domain of the plurality of domains based on an analysis of the data, and issuing a command to cause the at least one action to be taken in the first domain. Platform 510 can facilitate in whole or in part obtaining data from a plurality of domains, wherein the plurality of domains includes a mobility core networking analytics domain, a backhaul transport networking analytics domain, and an Internet Protocol multimedia subsystem (IMS) core networking analytics domain, identifying at least a first action to be taken in at least a first domain of the plurality of domains based on an analysis of the data, and issuing at least a first command to cause the at least a first action to be taken in the at least a first domain. Platform 510 can facilitate in whole or in part analyzing data associated with a plurality of network domains, identifying, based on the analyzing of the data, a first action to be taken in a first network domain of the plurality of network domains, identifying, based on the analyzing of the data, a second action to be taken in a second network domain of the plurality of network domains, issuing a first directive to the first network domain to cause a first communication device in the first network domain to take the first action, and issuing a second directive to the second network domain to cause a second communication device in the second network domain to take the second action.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7)/diameter (DRA) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7/diameter signaling network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
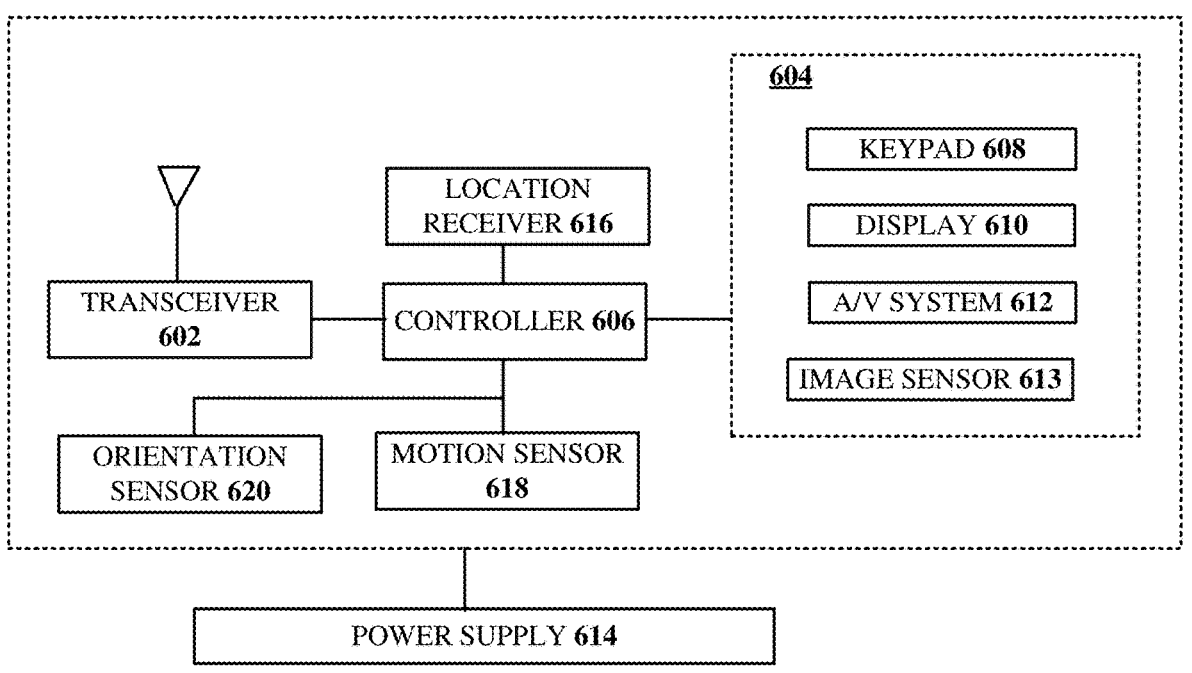
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part monitoring a plurality of activities associated with a plurality of domains, wherein the plurality of domains includes a core domain, an access domain, a transport domain, and a security domain, obtaining, based on the monitoring, data representative of the plurality of activities, identifying at least one action to be taken in a first domain of the plurality of domains based on an analysis of the data, and issuing a command to cause the at least one action to be taken in the first domain. Computing device 600 can facilitate in whole or in part obtaining data from a plurality of domains, wherein the plurality of domains includes a mobility core networking analytics domain, a backhaul transport networking analytics domain, and an Internet Protocol multimedia subsystem (IMS) core networking analytics domain, identifying at least a first action to be taken in at least a first domain of the plurality of domains based on an analysis of the data, and issuing at least a first command to cause the at least a first action to be taken in the at least a first domain. Computing device 600 can facilitate in whole or in part analyzing data associated with a plurality of network domains, identifying, based on the analyzing of the data, a first action to be taken in a first network domain of the plurality of network domains, identifying, based on the analyzing of the data, a second action to be taken in a second network domain of the plurality of network domains, issuing a first directive to the first network domain to cause a first communication device in the first network domain to take the first action, and issuing a second directive to the second network domain to cause a second communication device in the second network domain to take the second action.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

monitoring a plurality of activities associated with a plurality of domains, wherein the plurality of domains includes a core domain, an access domain, a transport domain, and a security domain;

obtaining, based on the monitoring, data representative of the plurality of activities;

obtaining inputs from third parties, wherein the third parties include: first users of a network, second users of a second network, media content creators, advertisers, and distributors;

identifying a plurality of actions to be taken in a first domain of the plurality of domains based on an analysis of the data and an analysis of the inputs from the third parties; and issuing a command to cause the plurality of actions to be taken in the first domain, wherein the issuing of the command causes the first domain to instantiate an instance of a first function, discard an instance of a second function, and modify an instance of a third function, wherein the issuing of the command causes the first domain to partition a coverage of the network into a plurality of slices, and wherein a number of the plurality of slices is based on an identification of a plurality of parameters, the plurality of parameters including: network loads of the network, processing loads, communication device capabilities, communication sessions, user preferences, mobility, media consumed or requested, social media activities, and environmental factors, wherein the issuing of the command causes the first domain to transfer a first communication session associated with a first user equipment, and wherein the transfer includes supplementing a first radio access technology with a second radio access technology that is different from the first radio access technology.

2. The device of claim 1, wherein the issuing of the command comprises issuing the command to the first domain.

3. The device of claim 1, wherein the issuing of the command comprises issuing the command to a second domain of the plurality of domains to cause the second domain to issue a second command to the first domain, and wherein the second command directs the first domain to take the plurality of actions.

4. The device of claim 1, wherein the issuing of the command causes the first domain to initiate a handover of a second communication session of a second user equipment from a first cell of a plurality of cells to a second cell of the plurality of cells.

5. The device of claim 1, wherein the issuing of the command causes the first domain to transfer a second communication session associated with a first second user equipment from the first radio access technology to the second radio access technology that is different from the first radio access technology.

6. The device of claim 1, wherein the issuing of the command causes the first domain to select a first content item to provide to a second user equipment and a second content item to provide to a third user equipment, wherein the second content item is different from the first content item.

7. The device of claim 6, wherein the first content item includes a first advertisement and the second content item includes a second advertisement that is different from the first advertisement, wherein the second user equipment is associated with a first user and the third user equipment is associated with a second user, and wherein the first advertisement is selected based on first social media profile associated with the first user and the second advertisement is selected based on a second social media profile associated with the second user.

8. The device of claim 1, wherein the issuing of the command causes the first domain to grant access to a service to a second user equipment and deny access to the service to a third user equipment.

9. The device of claim 1, wherein each slice of the plurality of slices includes an instance of at least one function of a plurality of functions.

10. A non-transitory machine-readable medium, comprising executable instructions that, when executed by a processing system including a processor, facilitate performance of operations, the operations comprising:

obtaining data from a plurality of domains, wherein the plurality of domains includes a mobility core networking analytics domain, a backhaul transport networking analytics domain, and an Internet Protocol multimedia subsystem (IMS) core networking analytics domain;

obtaining inputs from third parties, wherein the third parties include: first users of a network, second users of a second network, media content creators, advertisers, and distributors;

identifying a plurality of actions to be taken in at least a first domain of the plurality of domains based on an analysis of the data and an analysis of the inputs from the third parties; and issuing at least a first command to cause the plurality of actions to be taken in the at least a first domain, wherein the issuing of the at least a first command causes the at least a first domain to instantiate an instance of a first function, discard an instance of a second function, and modify an instance of a third function, wherein the issuing of the at least a first command causes the first domain to partition a coverage of the network into a plurality of slices, and wherein a number of the plurality of slices is based on an identification of a plurality of parameters, the plurality of parameters including: network loads of the network, processing loads, communication device capabilities, communication sessions, user preferences, mobility, media consumed or requested, social media activities, and environmental factors, and wherein the issuing of the at least a first command causes the first domain to transfer a first communication session associated with a first user equipment, and wherein the transfer includes supplementing a first radio access technology with a second radio access technology that is different from the first radio access technology.

11. A method, comprising:

analyzing, by a processing system including a processor, data associated with a plurality of network domains;

obtaining inputs from third parties, wherein the third parties include: first users of a network, second users of a second network, media content creators, advertisers, and distributors;

identifying, by the processing system and based on the analyzing of the data and an analysis of the inputs from the third parties, a plurality of first actions to be taken in a first network domain of the plurality of network domains;

identifying, by the processing system and based on the analyzing of the data, a second action to be taken in a second network domain of the plurality of network domains;

issuing, by the processing system, a first directive to the first network domain to cause a first communication device in the first network domain to take the plurality of first actions, the plurality of first actions including instantiating an instance of a first function, discarding an instance of a second function, and modifying an instance of a third function, wherein the issuing of the first directive causes the first network domain to partition a coverage of the network into a plurality of slices, and wherein a number of the plurality of slices is based on an identification of a plurality of parameters, the plurality of parameters including: network loads of the network, processing loads, communication device capabilities, communication sessions, user preferences, mobility, media consumed or requested, social media activities, and environmental factors, and wherein the issuing of the first directive causes the first network domain to transfer a first communication session associated with a first user equipment, and wherein the transfer includes supplementing a first radio access technology with a second radio access technology that is different from the first radio access technology; and issuing, by the processing system, a second directive to the second network domain to cause a second communication device in the second network domain to take the second action.

12. The method of claim 11, wherein the first communication device includes a network element and the second communication device includes a second user equipment, the method further comprising:

obtaining, by the processing system and subsequent to the issuing of the first directive, second data associated with the first network domain;

analyzing, by the processing system, the second data to identify a third action to be taken in the first network domain, a third network domain, or a combination thereof; and issuing, by the processing system, a third directive corresponding to the third action to the first network domain, the third network domain, or the combination thereof.

13. The method of claim 11, wherein the first communication device includes a first network element and the second communication device includes a second network element.

14. The method of claim 13, wherein the first communication device includes a first base station and the second communication device includes a router, a gateway, or a switch.

15. The method of claim 11, wherein the first communication device in the first network domain issues a third directive to the second network domain to cause the second communication device, a third communication device in the second network domain, or a combination thereof, to take a third action, and wherein the third directive is based on the first directive.

16. The method of claim 11, wherein the first network domain includes a core network domain and the second network domain includes an access network domain, a mobility network domain, a transport network domain, a security network domain, or any combination thereof.

17. The method of claim 11, wherein the first communication device and the second communication device are each a user equipment included as part of a peer-to-peer network.

18. The non-transitory machine-readable medium of claim 10, wherein the analysis of the data is based on a use of an algorithm, wherein the algorithm is based on a use of machine learning, artificial intelligence, and statistics, wherein the analysis identifies a pattern in the data, a value contained within the data exceeding a threshold, and an absence of a subset of data that was expected to be contained within the data.

19. The device of claim 1, wherein the environmental factors include obstacles in a line-of-sight in respect of a communication device, temperature, wind, and humidity.

* * * * *